United States Patent [19]
Nakata et al.

[11] Patent Number: 5,877,818
[45] Date of Patent: Mar. 2, 1999

[54] SPECIAL EFFECT PICTURE DEVICE

[75] Inventors: Tetsuro Nakata; Tetsuya Harada; Motomu Ueta, all of Kanagawa, Japan

[73] Assignee: Sony Corporation, Tokyo, Japan

[21] Appl. No.: 824,498

[22] Filed: Mar. 26, 1997

Related U.S. Application Data

[63] Continuation of Ser. No. 429,546, Apr. 27, 1995, Pat. No. 5,625,420.

[30] Foreign Application Priority Data

Apr. 28, 1994 [JP] Japan ................................. 6-091543

[51] Int. Cl.$^6$ ...................................................... H04N 9/74
[52] U.S. Cl. ......................... 348/590; 348/580; 348/584; 348/598
[58] Field of Search ..................................... 348/580–583, 348/518, 584, 586, 587, 588, 590, 593, 598, 599, 600; 382/285; 345/121, 113, 114; H04N 9/74

[56] References Cited

U.S. PATENT DOCUMENTS

| | | | |
|---|---|---|---|
| 4,851,912 | 7/1989 | Jackson et al. | 348/585 |
| 5,121,210 | 6/1992 | Hirayama | 348/598 |
| 5,280,357 | 1/1994 | DesJardins | 348/590 |
| 5,327,177 | 7/1994 | DesJardins et al. | 348/586 |
| 5,408,272 | 4/1995 | Barnette et al. | 348/585 |
| 5,625,420 | 4/1997 | Nakata et al. | 348/580 |

*Primary Examiner*—Michael Lee
*Attorney, Agent, or Firm*—Frommer Lawrence & Haug, LLP.; William S. Frommer

[57] ABSTRACT

A special effect picture device is disclosed in which a transformed picture which is non-linear with respect to an original signal is formed using a video signal and a key signal for the original signal. A video signal is stored in a video signal storage unit and a key signal is stored in a key signal storage unit. The read-out addresses for the information concerning an upper picture of the transformed picture and the information concerning a lower picture of the transformed picture and also the information concerning the depth are generated by a read-out address generating unit. The key signal read out from the key signal storage unit and the video signal read out from the video signal storage unit are respectively divided by a dividing unit into upper and lower key signals and upper and lower video signals responsive to the read-out address for the upper picture and read-out address for the lower picture. The upper picture and the lower picture are synthesized by a picture synthesizing unit using the upper and lower key signals and the upper and lower key signals divided by the dividing unit. The synthesized picture synthesized by the picture synthesizing unit is freed of unnecessary portions depending on the depth information generated by the read-out address generating unit for generating the transformed picture.

4 Claims, 13 Drawing Sheets

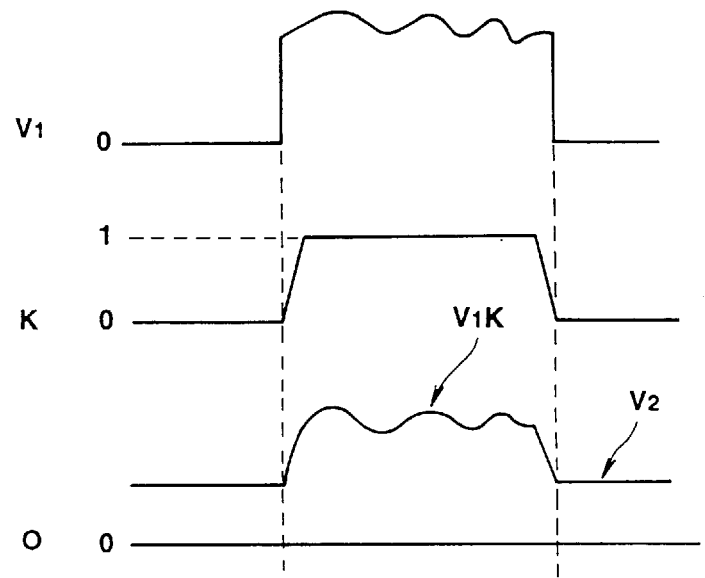
FIG.1A PRIOR ART
FIG.1B PRIOR ART
FIG.1C PRIOR ART
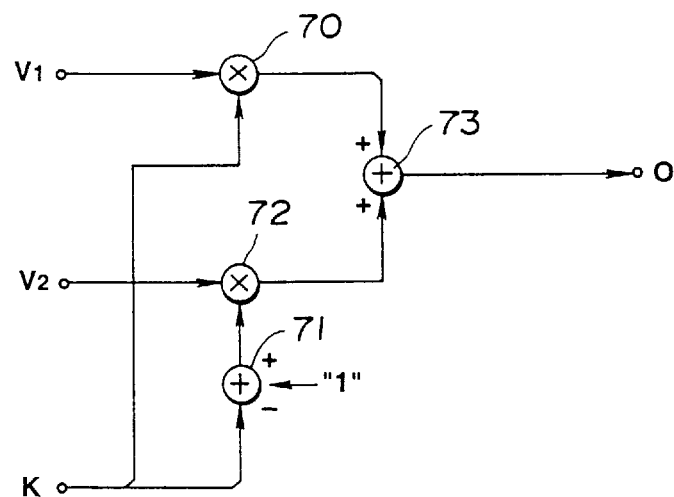
FIG.2
PRIOR ART

FIG.10A
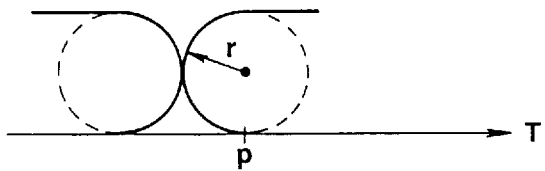
FIG.10B
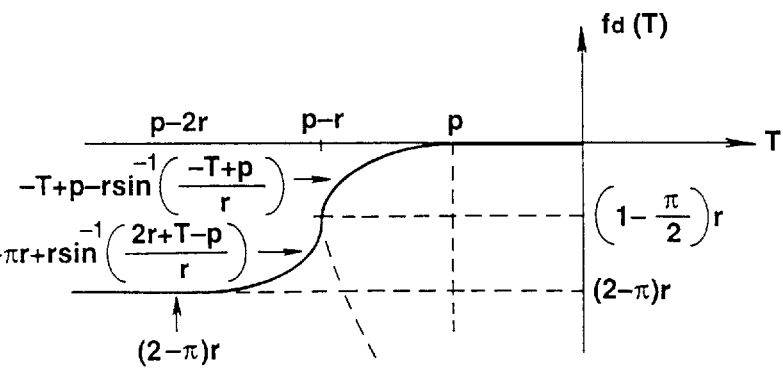
FIG.10C

SPECIAL EFFECT PICTURE DEVICE

This is application is a continuation of application Ser. No. 08/429,546, filed Apr. 27, 1995, now U.S. Pat. No. 5,625,420.

BACKGROUND OF THE INVENTION

This invention relates to a special effect picture device for generating a non-linear transformed picture of an original picture using the information of the original picture.

It is practiced to perform special effect processing on picture signals using a buffer memory. For example, special effect processing is executed by controlling the write address for writing picture signals into a frame buffer memory or by controlling the read-out address for reading out the picture signals from the frame buffer memory.

Examples of the special effect processing include linear picture transformation, such as contraction, enlargement, movement or rotation, ripple effects which is producing moire pictures, or superimposition of a transformed picture on itself (on the original picture), and non-linear effects, such as page-turning effect comparable to folding of a book page. The special effect processing is performed by a special effect picture device.

The special effect processing, performed by the special effect picture device, is basically the synthesis of picture signals. For example, two signals, that is a video signal $V_1$ shown in FIG. 1A and a key signal K shown in FIG. 1B, and another signal, which is a background signal $V_2$, are synthesized by a switcher for outputting a synthesized signal 0 shown in FIG. 1C.

Specifically, the above special effect picture device outputs the synthesized signal 0 by the technique explained with reference to FIG. 2. The input video signal $V_1$ shown in FIG. 1A and the key signal K shown in FIG. 1C are multiplied by each other by a multiplier 70 to give a product $V_1K$. On the other hand, the key signal K is subtracted by a subtractive node 71 from "1" to give difference (1−K) which is then multiplied by the background signal $V_2$ by a multiplier 72 to give a product $V_2(1-K)$. The product $V_2(1-K)$ from the multiplier 72 is summed to the product $V_1K$ from the multiplier 70 by an additive node 73 to give a synthesized output signal 0 such that $$0 = V_1 K + V_2(1-K) \qquad (1)$$

In the equation (1), the boundary between the input video signal $V_1$ and the background signal $V_2$ is determined by the gradient of the key signal K.

The page turning effect, realized by the above special effect picture device, is explained with reference to FIG. 3.

The page turning effect is an effect of folding an input picture V at a position M. When observed from the lateral side, the folded portion is cylindrically-shaped. For folding, a coordinate system (X:Y:L) is necessary for representing the folding direction and a folding position M. An axis T represents the folding direction. In the coordinate system, $X_L$ on the x-axis and $Y_L$ on the y-axis represent linear addresses, that is, addresses used for linear transformation, such as contraction, enlargement, movement or rotation. The axis T is given by an equation $$T = X_L * \cos\theta + Y_L * \sin\theta \qquad (2)$$

where θ denotes an angle indicating the folding direction

In FIG. 3, a lower picture $V_b$, shown by a solid line, is situated ahead of an imaginary cylinder as far as the visual sense of the viewer is concerned. This may be conceived as being caused by transformation which shifts the linear addressees of the lower picture for compression along the T axis. A movement function $f_D(T)$ representing the movement of the lower picture is given by $$f_D(T) = -T + p - r * \arcsin((-T+p)/r) \qquad (3)$$

where r and p denote the radius and the center of the imaginary cylinder, respectively.

The components of the linear addresses $(X_L, Y_L)$ shown by the equation (2) are each added to with the movement function multiplied by cosθ and sin θ. Thus the X-axis read-out address $X_{DL}$ and the Y-axis read-out address $Y_{DL}$ of the lower picture of the page-turning effect are given by $$X_{DL} = X_L + f_D(T) * \cos\theta \qquad (4)$$

$$Y_{DL} = Y_L + f_D(T) * \sin\theta \qquad (5)$$

On the other hand, if the movement function indicating the movement of an upper picture is represented by $f_U(T)$, the X-axis read-out address $X_{UL}$ and the Y-axis read-out address $Y_{UL}$ of the upper picture of the page-turning effect are given by $$X_{UL} = X_L + f_U(T) * \cos\theta \qquad (6)$$

$$Y_{UL} = Y_L + f_U(T) * \sin\theta \qquad (7)$$

FIGS. 4B and 4C show characteristics of the movement function $f_D(T)$ representing the movement of the lower picture and the movement function $f_U(T)$ representing the movement of the upper picture, respectively. The movement function for the lower picture $f_D(T)$ and the movement function for the upper picture $f_U(T)$ are previously written in a static RAM used as a lookup table, under control by a central processing unit (CPU), and reference thereto may be had from the lookup table with the value of T as an address. FIG. 4A shows a curve for the folding portion of FIG. 3 as viewed from the lateral side.

FIG. 5 is an illustrative circuit diagram showing a page-turning address generating circuit for producing the read-out address for the lower picture and that for the upper picture shown by the equations (4) to (7).

Referring to FIG. 5, a linear address $X_L$ and cost are routed to a multiplier 80, while a linear address $Y_L$ and sine are routed to a multiplier 82. An additive node 81 adds the output $X_L*\cos\theta$ of the multiplier 80 to the output $Y_L*\sin\theta$ of the multiplier 82 to output an addition output $X_L*\cos\theta + Y_L*\sin\theta$. The addition output $X_L*\cos\theta + Y_L*\sin\theta$ is T shown in the equation (2). Any desired angle of rotation is set as cosθ and sinθ as a special picture effect by the CPU. A table for the upper picture movement function 83 and a table for the lower picture movement function 84, as the above-mentioned lookup tables, output the movement function $f_U(T)$ for the upper picture and the movement function $f_D(T)$ for the lower picture, with the value of T as the address, respectively.

The movement function $f_U(T)$ for the upper picture, outputted by the table for the upper picture movement function 83, is supplied to multipliers 86, 87. The movement function $f_D(T)$ for the lower picture, outputted by the table for the lower picture movement function 84, is supplied to multipliers 90, 91.

The multiplier 86 multiplies the movement function $f_U(T)$ for the upper picture by cosθ to output a product $f_U(T)*\cos\theta$ which is outputted to an additive node 85. The additive node 85 adds the linear address $X_L$ to the product $f_U(T)*\cos\theta$ to give a sum output $X_L+f_U(T)*\cos\theta$ which is outputted as an X-axis read-out address $X_{UL}$ for the upper picture, as shown by the equation (6).

The multiplier 87 multiplies the movement function $f_U(T)$ for the upper picture with $\sin\theta$ to give a product $f_U(T)*\sin\theta$ to an additive node 88. The additive node 88 adds the linear address $Y_L$ to the product $f_U(T)*\sin\theta$ to give a sum output $Y_L+f_U(T)*\sin\theta$ which is outputted as an Y-axis read-out address $Y_{UL}$ for the upper picture, as shown by the equation (7).

The multiplier 90 multiplies the movement function $f_D(T)$ for the lower picture by cost to output a product $f_D(T)*\cos\theta$ which is outputted to an additive node 89. The additive node 89 adds the linear address $X_L$ to the multiplication output $f_D(T)*\cos\theta$ to give a sum output $X_L+f_D(T)*\cos\theta$ which is outputted as an X-axis read-out address $X_{DL}$ for the lower picture, as shown by the equation (4).

The multiplier 91 multiplies the movement function $f_D(T)$ for the lower picture with $\sin\theta$ to give a product $f_D(T)*\sin\theta$ to an additive node 92. The additive node 92 adds the linear address $Y_L$ to the product $f_D(T)*\sin\theta$ to give a sum output $Y_L+f_D(T)*\sin\theta$ which is outputted as a Y-axis read-out address $Y_{DL}$ for the lower picture, as shown by the equation (5).

An output T of the additive node 81 is supplied to an FC table as later explained so as to be used as an address for having reference to an effective area detection flag Fc as later explained.

The above-described circuit shown in FIG. 5 is a circuit portion for generating various addresses for generating the page-turning effect, and is termed a page-turning address generating circuit.

The above-described conventional special effect picture device, inclusive of the page turning address generating circuit shown in FIG. 5, is explained by referring to FIG. 6.

The conventional special picture device is arranged as shown in FIG. 6.

Video input data are stored in a video memory 101 as a frame buffer memory. Key signals are stored in a key memory 102. There are two types of the key signals, one of which is a picture frame signal corresponding to a picture frame supplied from a picture frame key signal generating unit 103. The other key signal is an external key signal employed when accepting an optional shape and may be a letter or character signal for Telop or a key signal generated by a chroma key unit. These two types of the key signals are changeover-selected by a changeover switch 104. That is, the external key signal and the picture frame signal from the picture frame key signal generating circuit 103 are fed to an input fixed terminal a and an input fixed terminal b of the changeover switch 104. One of the two types of the key signals is supplied by setting of a movable output terminal c of the changeover switch 104 to the key memory 102.

A linear address generating circuit 105 adds the effects of contraction, enlargement, movement or rotation to basic addresses H and V, as two-dimensional addresses indicating the positions of the respective sampling points of video and key outputs, in order to generate the linear addresses $X_L$, $Y_L$, which are routed to a page turning address generating circuit 106, which is the non-linear address generating unit.

As explained with reference to FIG. 5, the page turning address generating circuit 106 transmits the X-axis read-out address $X_{DL}$ and the Y-axis read-out address $Y_{DL}$ for the lower picture of the page turning effect shown in equations (4) and (5) to an effective area detector 107a and to a fixed input terminal a of a changeover switch 108, while transmitting the X-axis read-out address $X_{UL}$ and the Y-axis read-out address $Y_{UL}$ for the upper picture of the page turning effect shown in equations (6) and (7) to an effective area detector 107b and to a fixed input terminal b of a changeover switch 108. The read-out addresses $X_{DL}$ and $Y_{DL}$ are referred to herein as the read-out addresses for the lower picture ($X_{DL}$, $Y_{DL}$), while the read-out addresses $X_{UL}$ and $Y_{UL}$ are referred to herein as the read-out addresses for the upper picture ($X_{UL}$, $Y_{UL}$).

The effective area detectors 107a, 107b evaluate the values of the read-out addresses ($X_{DL}$, $Y_{DL}$) for the lower picture and the values of the read-out addresses ($X_{UL}$, $Y_{UL}$) for the upper picture and, if the addresses are effective addresses corresponding to an actually existing picture, output a high-level signal "H" as effective area detection flags Fa and Fb, respectively. Since the read-out addresses are defined for the totality of output sampling points, there are generated read-out addresses outside of the range of the effective addresses of the video memory 101 as the frame buffer memory as far as the arithmetic-logical operations are concerned. The picture data read out with the read-out addresses exceeding the effective addresses of the video memory 101 are indefinite picture data. In addition, if the upper picture is superimposed on the lower picture as in the case of page-turning, it is necessary to define an area in which the upper picture is outputted so that the upper picture, if found to be ineffective, can be switched to data for the lower picture. For this reason, the two effective area detection units 107a and 107b are provided in association with the read-out addresses for the lower picture ($X_{DL}$, $Y_{DL}$) and the read-out addresses for the upper picture ($X_{UL}$, $Y_{UL}$), respectively, so that the effective area detection flags Fa, Fb will be outputted if the read-out addresses are effective addresses.

Meanwhile, the page turning address generating circuit 106 is responsive to the linear addresses $X_L$, $Y_L$ supplied from the linear address generating circuit 105 to output the effective area flag Fc indicating an effective area in the L-axis direction of the (X:Y:Z) coordinate system. With the page turning, there disappears a picture beyond a certain point on the axis T because of the picture folding effect. Thus, the table 84 for $f_D(T)$ outputting the lower picture movement function $f_D(T)$ or the table 83 for $f_U(T)$ outputting the upper picture movement function $f_L(T)$ cannot define table data which are $f_D(T)$ or $f_U(T)$, respectively. Thus the read-out addresses calculated by the equations (4) to (7) contain ineffective addresses. It is the effective area detection flag Fc that indicates an area free from the ineffective addresses.

The effective area detection flag Fc may be read out from an Fc table 93 shown in FIG. 5. That is, the effective area detection flag Fc is pre-written in a 1-bit lookup table, under control by the CPU, such that the value T of the T-axis may be found by having reference to the Fc table 93 which is the above-mentioned lookup table.

Returning to FIG. 6, the changeover switch 108 is used for changing over the read-out address between the read-out addresses for the upper picture ($X_{UL}$, $Y_{UL}$) and the read-out addresses for the lower picture ($X_{DL}$, $Y_{DL}$), and has its changeover operation controlled by an AND gate 109 as will be explained subsequently.

A changeover switch 112 is used for replacing an area of data read out from the video memory 101 by a black level if the data is invalid, and is controlled as to its changeover operation by an AND gate 111 as will be explained subsequently.

A changeover switch 113 is used for replacing an area of data read out from the key memory 102 by data "0" if the data is invalid and, similarly to the changeover switch 112, has its changeover controlled by the AND gate 111.

The effective area flag Fa of the effective area detection unit 107a is supplied to an OR gate 110, while the effective flag Fb of the effective area detection unit 107b is supplied to the OR gate 110 and an AND gate 109 and the effective area flag Fc of the page turning address generator 106 is supplied to the AND gates 111 and 109. An output of the OR gate 110 is supplied to the AND gate 111.

Thus, if both the effective area detection flag Fb and the effective area detection flag Fc are both "H", that is if the read-out address for the upper picture ($X_{UL}$, $Y_{UL}$) are effective addresses and the linear addresses ($X_L$, $Y_L$) are effective addresses, the AND gate 109 causes the movable contact c and the fixed terminal b of the changeover switch 108 to be connected to each other to select the read-out addresses ($X_{UL}$, $Y_{UL}$) for the upper picture.

The AND gate 111 is fed with an effective area detection flag Fc and an output of the OR gate 110 fed with the effective area detection flags Fa and Fb. Thus, when the effective area detection flags Fa, Fb and Fc are all "H", that is when the upper picture read-out addresses ($X_{UL}$, $Y_{UL}$), lower picture readout addresses ($X_{DL}$, $Y_{DL}$) and the linear addresses $X_L$, $Y_L$ are effective addresses, the AND gate 111 allows the movable contact c of the changeover switch 112 to be connected to its fixed terminal b for selecting the output data of the video memory 101. If otherwise, the AND gate 111 causes selection of the black level supplied from the movable contact c.

Similarly, when the effective area detection flags Fa, Fb and Fc are all "H", that is when the upper picture read-out addresses ($X_{UL}$, $Y_{UL}$), lower picture read-out addresses ($X_{DL}$, $Y_{DL}$) and the linear addresses $X_L$, $Y_L$ are effective addresses, the AND gate 111 allows the movable contact c of the changeover switch 111 to be connected to its fixed terminal b for selecting output data of the key memory 102. If otherwise, the AND gate 111 causes selection of data "0" supplied from the movable contact . With the above-described conventional special effect picture 11 device, since the upper picture read-out address is changed over to the lower picture read-out address and vice versa, edge serrations caused by switching between the upper and lower pictures at the sampling points are produced in an area 124b shown in FIG. 7. On the other hand, since the key signal is changed over to "0" by the changeover switch 113 in an area 124a of FIG. 7, the key signal K becomes devoid of a gradient, so that edge serrations are similarly produced on synthesis by the switcher.

That is, the pictures are changed over suddenly at a certain point if the key signal is devoid of the gradient. If the input video signal $V_1$, background signal $V_2$ and the key signal K are digitized by A/D conversion, the pictures are changed over suddenly at a certain sampling point, so that edge serrations are produced with the sampling point as the edge.

The position and the shape of the edge serrations produced in the above-described page turning effect are as shown in FIG. 7, in which, if the page-turning effect of folding a left-hand edge 123 of a paper sheet 122 is to be manifested on a screen 121 of a monitoring device, there are produced edge serrations on the boundary areas 124a, 124b between the background signal $V_2$ and the video signal $V_1$, as shown to an enlarged scale at 124. These edge serrations deteriorate the accuracy of the special effect picture.

SUMMARY OF THE INVENTION

It is an object of the present invention to provide a special effect picture device whereby, when the effect of superimposing a transformed picture on itself, edge serrations may be prevented from being produced for improving accuracy of the special effect picture.

According to the present invention, there is provided a special effect picture device for forming a transformed picture which is non-linear with respect to an original picture, using a video signal and a key signal for said original picture, including: video signal storage means for storing said video signals; key signal storage means for storing said key signals; read-out address generating means for generating the read-out addresses for the information concerning an upper picture of the transformed picture and for the information concerning a lower picture of the transformed picture and for generating the information concerning the depth; means for dividing the key signal and the video signal read out from the key signal storage means and the video signal storage means respectively according to the read-out address output from the read-out address generating means into an upper key signal and a lower key signal and into an upper video signal and a lower video signal respectively; and means for generating the transformed picture by synthesizing the upper picture and the lower picture of the transformed picture using the upper and lower key signals and the upper and lower key signals output from said dividing means, and eliminating unnecessary portions according to the depth information generated by said read-out address generating means.

In the special effect picture device according to the present invention, the dividing means includes a first demultiplexor for dividing the video signal from the video signal storage means into the upper video signal and the lower video signal and a second demultiplexor for dividing the key signal from the key signal storage means into the upper key signal and the lower key signal.

Also, in the special effect picture device according to the present invention, the transformed picture is a page turning effect picture.

According to the present invention, since the picture synthesizing means synthesize a picture using the upper and lower key signals and the upper an lower video signals divided by the dividing means, and the synthesized picture is freed of unnecessary portions responsive to the depth information by the address generating means, the edge serrations may be suppressed and a special effect picture of high accuracy may be produced.

BRIEF DESCRIPTION OF THE DRAWINGS

FIGS. 1A, 1B and 1C are graphs for illustrating synthesis of video signals by a special effect picture device.

FIG. 2 is a circuit diagram for synthesizing video signals.

FIGS. 10A, 10B and 10C are graphs showing a picture movement function developed in the shape of a letter S.

DESCRIPTION OF THE PREFERRED EMBODIMENTS

Figure 3:
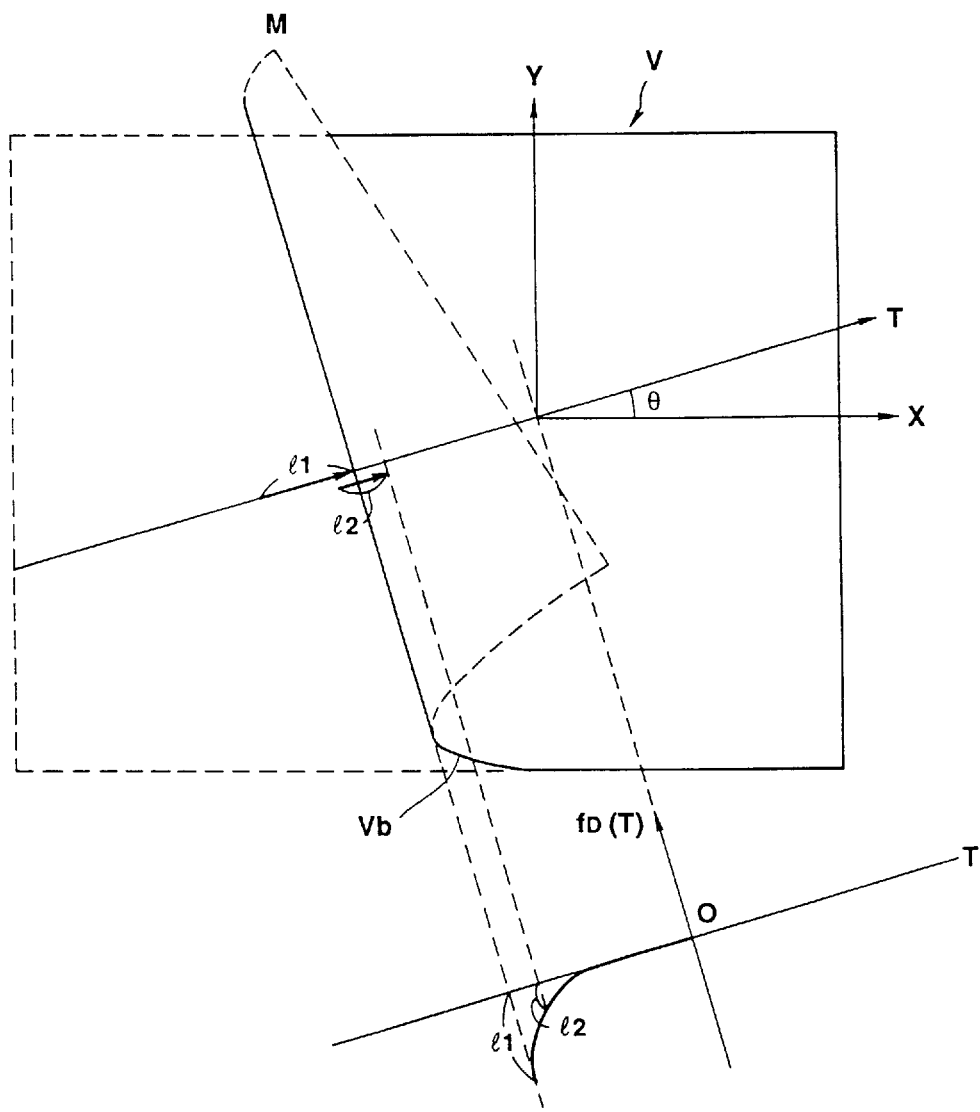
FIG. 3 illustrates a page turning effect performed by a conventional special effect picture device.
Figure 4A:
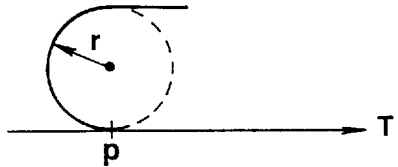
FIGS. 4A, 4B and 4C are graphs for illustrating picture movement functions employed when executing the page turning effect by the conventional special picture effect device.
Figure 4B:
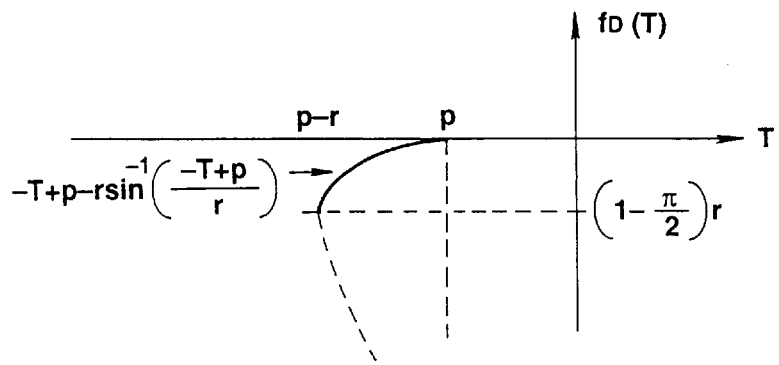
Figure 4C:
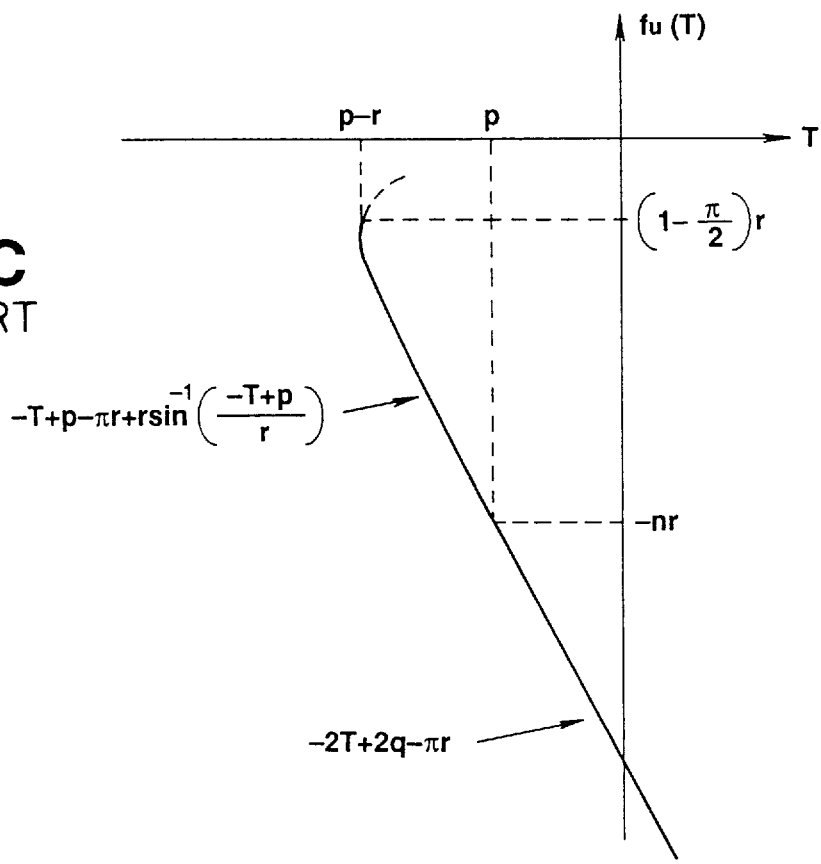
Figure 5:
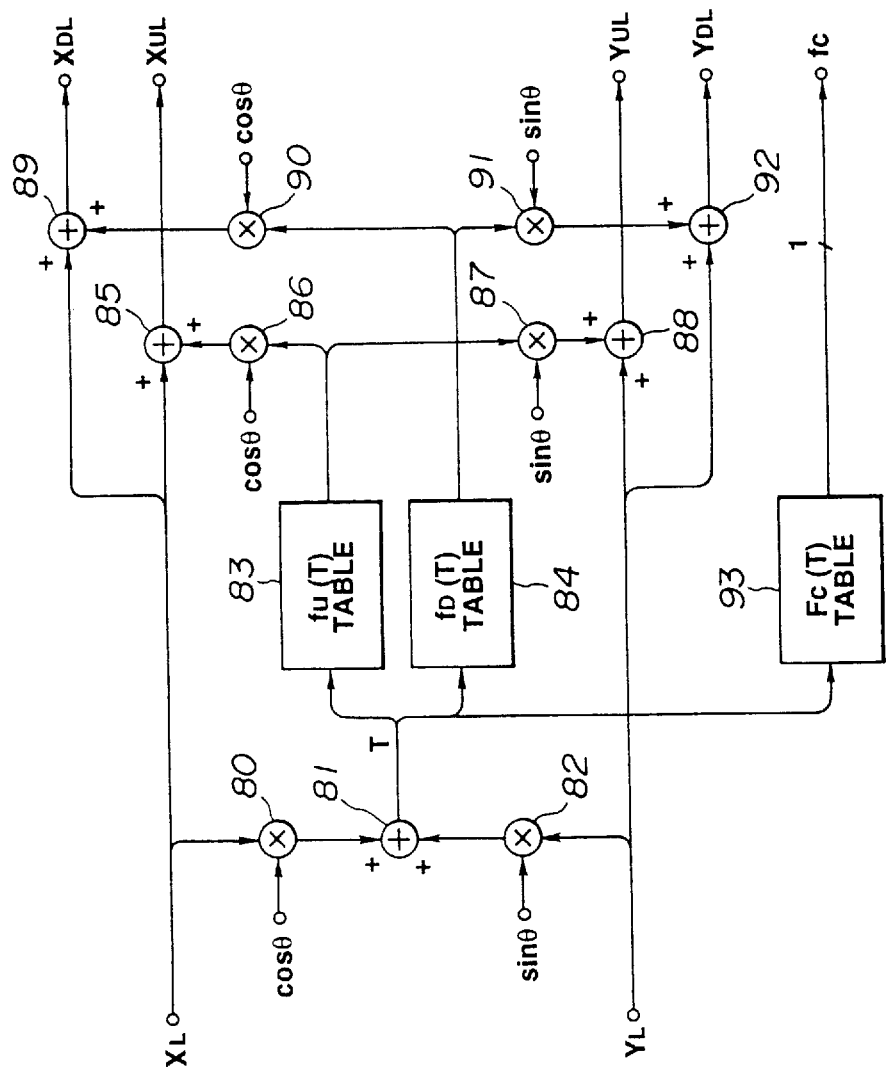
FIG. 5 is a circuit diagram for an illustrative page turning address generating circuit of the conventional special effect picture device.
Figure 6:
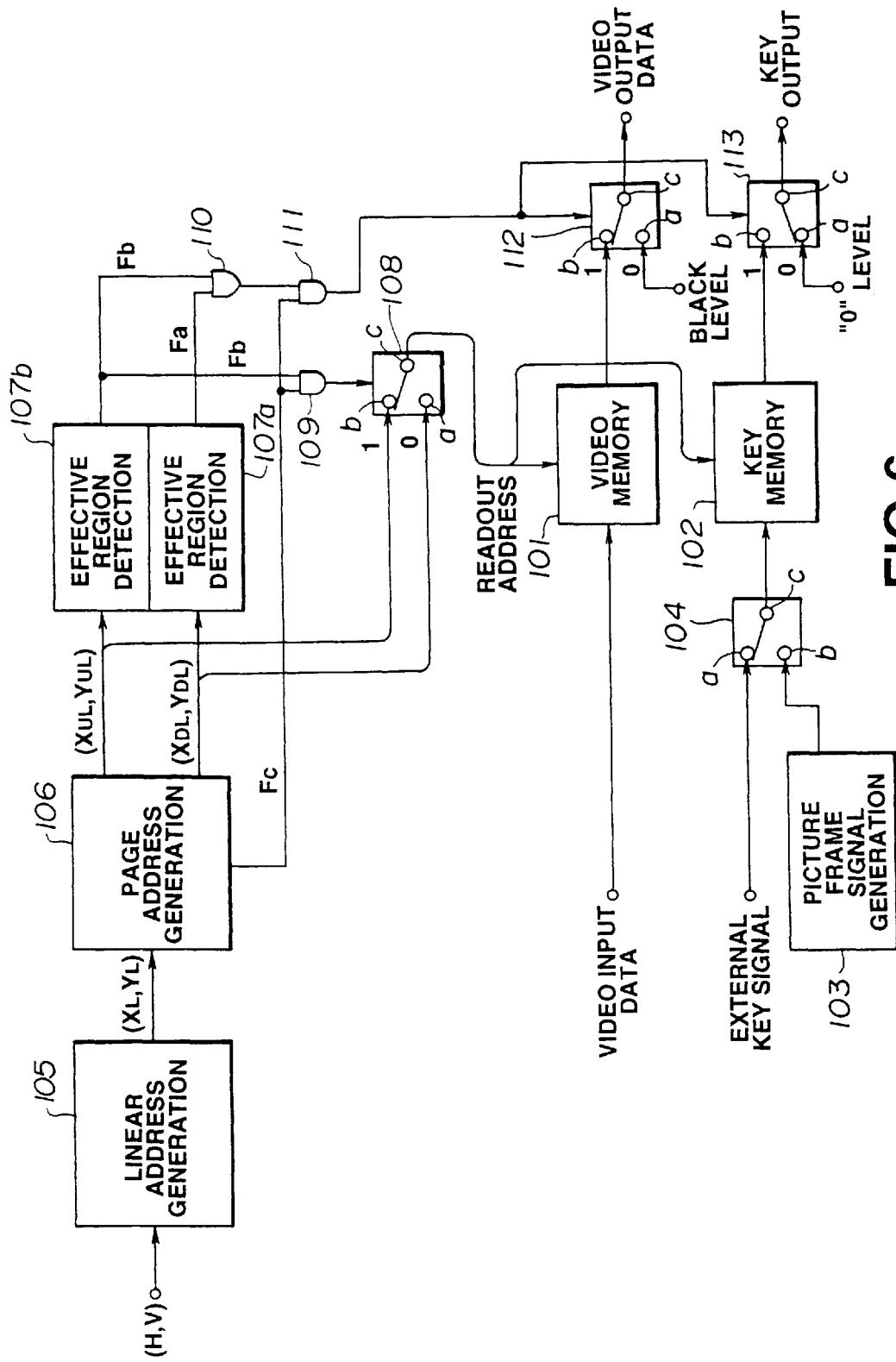
FIG. 6 is a block circuit diagram of the page turning address generating circuit of the conventional special effect picture device.
Figure 7:
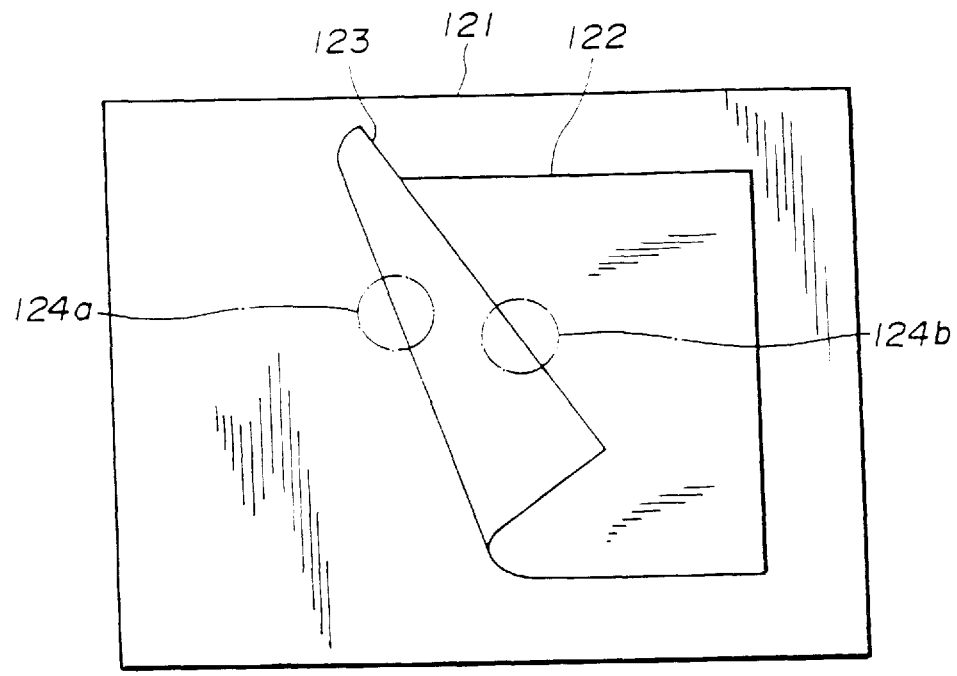
FIG. 7 illustrates edge serrations produced with the conventional special effect picture device.
Figure 7A:
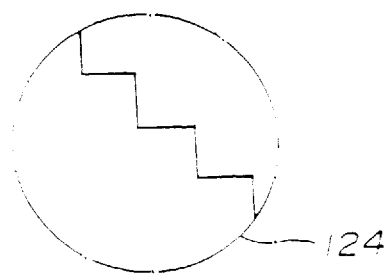

Referring to the drawings, illustrative embodiments of the present invention will be explained in detail. The present embodiment is directed to a special effect picture device capable of producing a page turning effect comparable to turning over a page of a book, as an example of the effect of superimposing a transformed picture on itself. The special effect picture device of the present embodiment exploits a so-called read-out system in which the input picture is stored in a frame buffer memory and the read-out address is rendered non-linear in order to produce a transformed picture.

Figure 8:
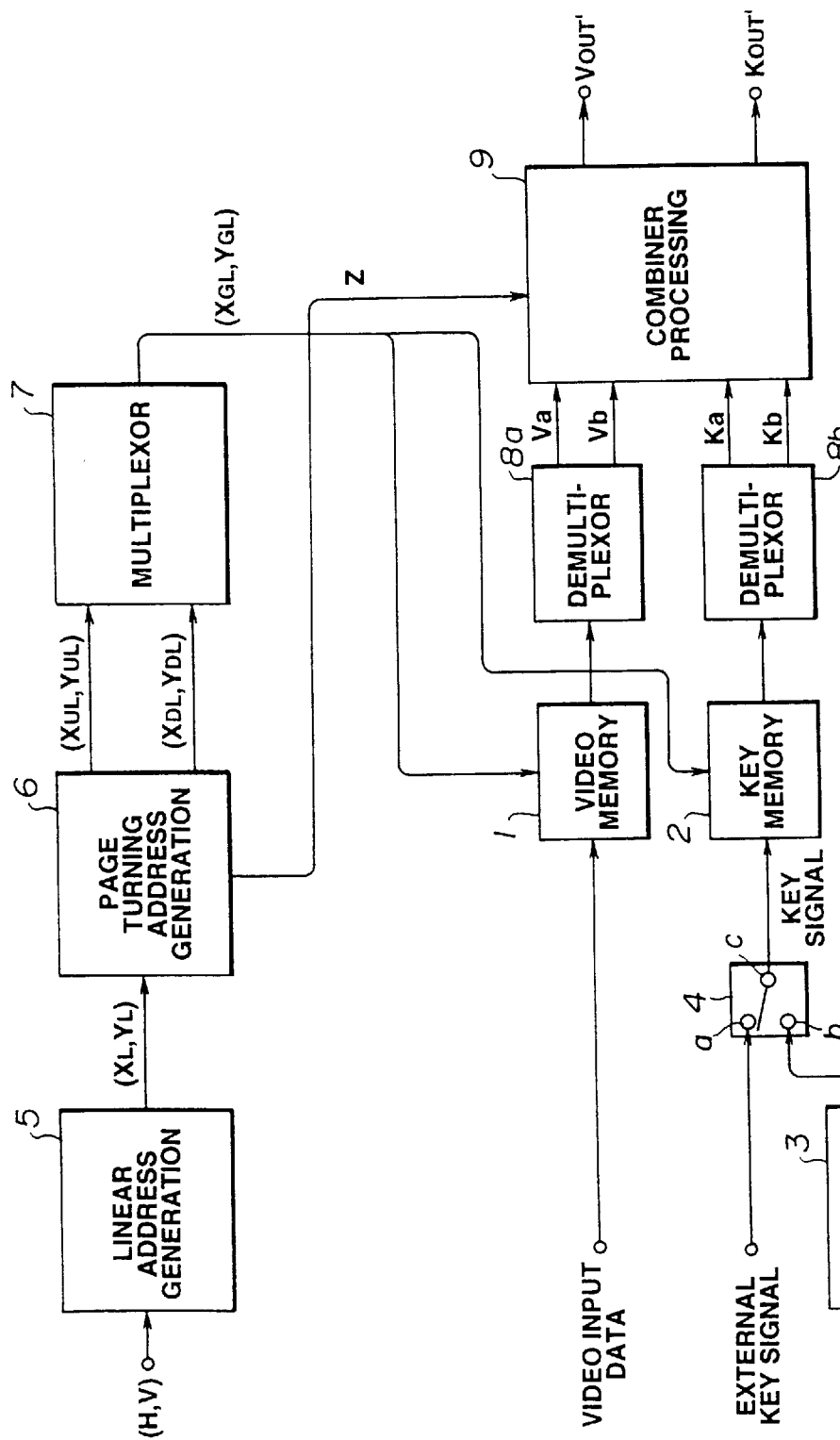
FIG. 8 is a block circuit diagram showing an arrangement of a special picture effect device embodying the present invention.

The special effect picture device of the present embodiment is designed and constructed as shown in FIG. 8.

Video input data concerning an original picture is stored in a video memory 1 as a frame buffer memory 1. Key signals concerning the original picture are stored in a key memory 2. There are two types of the key signals, one of which is a picture frame signal corresponding to a picture frame supplied from a picture frame key signal generating unit 3. The other key signal is an external key signal employed when accepting an optional shape and may be a letter or character signal for Telop or a key signal generated by a chroma key unit. These two types of the key signals are changeover-selected by a changeover switch 4. That is, the external key signal and the picture frame key signal from the picture frame key signal generating circuit 3 are fed to an input fixed terminal a and an input fixed terminal b of the changeover switch 104. One of the two types of the key signals is supplied by setting of a movable output terminal c of the changeover switch 4 to the key memory 2.

A linear address generating circuit 5 adds the effects of contraction, enlargement, movement and rotation to basic addresses (H, V), as two-dimensional addresses indicating the positions of the respective sampling points of video and key outputs to generate the linear addresses $(X_L, Y_L)$ which are routed to the page turning address generating circuit 6, which is the non-linear address generating unit. The page turning effect is the effect of folding an input picture at a certain position. For folding, the folding direction and the (X:Y:Z) coordinate system for representing the folding positions are required. The axis T represents the folding direction. If θ is an angle representing the folding direction, the axis T is represented by an equation $$T = X_L * \cos\theta + Y_L * \sin\theta \qquad (8)$$

where T is produced in the page turning address generating circuit 6.

Figure 9:
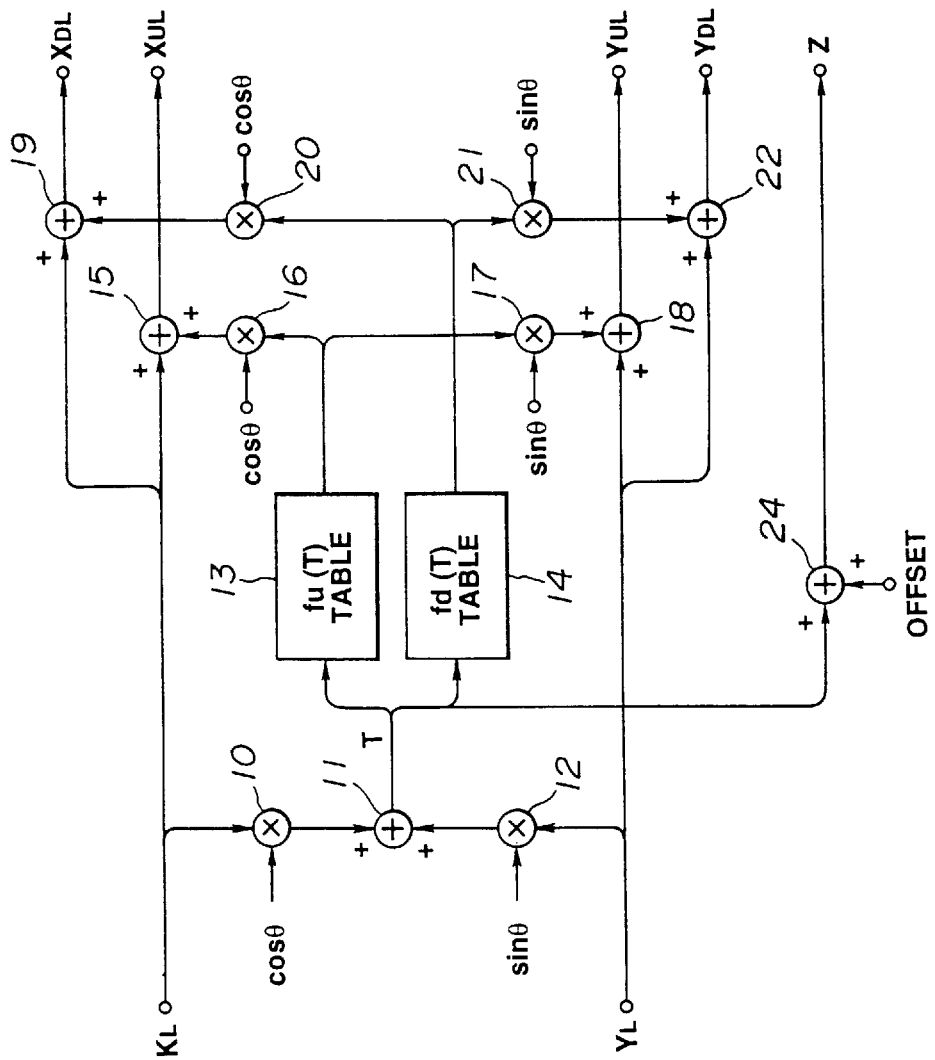
FIG. 9 is a circuit diagram showing an arrangement of a page turning address generating circuit of the special effect picture device shown in FIG. 8.

The page turning address generating circuit 6 is designed and arranged as shown in FIG. 9.

In this figure, a linear address $X_L$ and cosθ are fed to the multiplier 10, while the linear address $Y_L$ and sinθ are fed to the multiplier 12. An additive node 11 adds the output $X_L * \cos\theta$ of the multiplier 10 to the output $Y_L * \sin\theta$ of the multiplier 12 to output an addition output $X_L * \cos\theta + Y_L * \sin\theta$. The addition output $X_L * \cos\theta + Y_L * \sin\theta$ is T shown in the equation (8). Any desired angle of rotation is set as cosθ and sinθ as a special effect by a CPU. A table for an upper picture movement function 13 and a table for a lower picture movement function 14, as lookup tables, output the movement function $f_U(T)$ for the upper picture and the movement function $f_d(T)$ for the lower picture, with the value of T as the address, respectively.

In the table for $f_U(T)$ 13 and the table for $f_d(T)$ 14 are pre-written a picture movement function for development in an S-shape, as shown in FIG. 10. The picture movement function for development in the S-shape is now explained.

With the present embodiment of the special effect picture device, two pictures are synthesized by a combiner processing circuit 9, and the page turning effect is derived from the synthesized pictures. That is, with the synthesis of the two pictures by the combiner, picture edge portions of transition from the upper picture to the lower picture become smooth in accordance with the edge inclination of the key signals. This principle is utilized in the present special effect picture device for creating the page pattern effect. As will be explained in detail subsequently, the read-out addresses for the upper picture $(X_{UL}, Y_{UL})$ and the read-out addresses for the lower picture $(X_{DL}, Y_{DL})$, generated by the page turning address generating circuit 6, are respectively time-divisionally multiplexed to produce time-divisionally multiplexed read-out addresses $(X_{GL}, Y_{GL})$ which are supplied to the video memory 1 and the key memory 2. Video signals and key signals are respectively read from the video memory 1 and the key memory 2 and respectively divided into video signals and key signals for the upper picture and video signals and key signals for the lower picture. These divided signals are used to produce a picture shown in FIG. 11 and unnecessary portions are removed from the picture to produce a picture of the page-turning effect.

Figure 11:
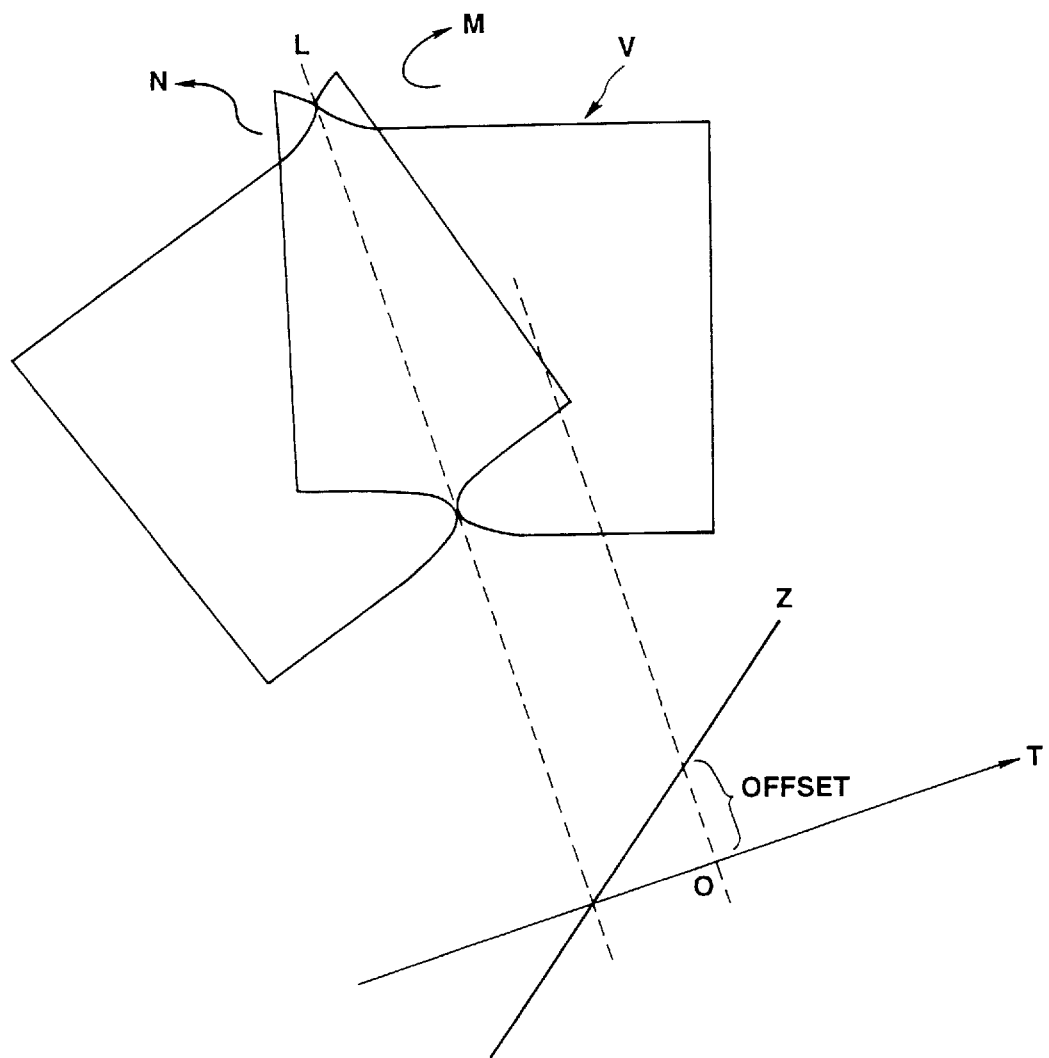
FIG. 11 illustrates a picture synthesized by a combiner processing circuit.

The page-turning picture shown in FIG. 11 is wrapped in an opposite direction N to the inherent direction M, with the fold line L as a reference, without being wrapped in the inherent direction M.

The above-described sequence of operations is performed for each of the read-out addresses for the upper picture $(X_{UL}, Y_{UL})$ and the read-out addresses for the lower picture $(X_{DL}, Y_{DL})$. The picture read out by these operations, if observed from the lateral side, presents an S-shape. For this reason, the sequence of operations performed using the read-out addresses for the upper picture $(X_{UL}, Y_{UL})$ and the read-out addresses for the lower picture $(X_{DL}, Y_{DL})$ is termed S-letter development of the read-out addresses. The functions used for the S-shaped development are termed the movement function for the upper picture $f_U(T)$ and the movement function for the lower picture $f_d(T)$.

FIG. 10A is a view of the picture of FIG. 11 looking from the lateral side. FIGS. 10B and 10C are graphs showing the movement function for the lower picture $f_d(T)$ and the movement function for the upper picture $f_U(T)$, respectively.

Returning to FIG. 9, the movement function for the upper picture $f_U(T)$, outputted from the $f_U(T)$ table 13, is supplied to multipliers 16 and 17. The movement function for the lower picture $f_d(T)$ outputted from the $f_d(T)$ table 14 is supplied to multipliers 20 and 21.

The multiplier 16 multiplies the movement function for the upper picture $f_U(T)$ with $\cos\theta$ and outputs the multiplication output $f_U(T)*\cos\theta$ to the additive node 15. The additive node 15 adds the linear address $X_L$ to the multiplication output $f_U(T)*\cos\theta$ and outputs the addition output $X_L+f_U(T)*\cos\theta$ as an X-axis read-out address $X_{UL}$ for the upper picture.

The multiplier 17 multiplies the movement function for the upper picture $f_U(T)$ with $\sin\theta$ and outputs the multiplication output $f_U(T)*\sin\theta$ to an additive node 18. The additive node 18 adds the linear address $Y_L$ to the multiplication output $f_U(T)*\sin\theta$ and outputs the addition output $Y_L+f_U(T)*\sin\theta$ as a Y-axis read-out address $Y_{UL}$ for the upper picture.

The multiplier 20 multiplies the movement function for the lower picture $f_d(T)$ with $\cos\theta$ and outputs the multiplication output $f_d(T)*\cos\theta$ to an additive node 19. The additive node 19 adds the linear address $X_L$ to the multiplication output $f_d(T)*\cos\theta$ and outputs the addition output $X_L+f_d(T)*\cos\theta$ as an X-axis read-out address $Y_{DL}$ for the lower picture.

The multiplier 21 multiplies the movement function for the lower picture $f_d(T)$ with sine and outputs the multiplication output $f_d(T)*\sin\theta$ to an additive node 22. The additive node 22 adds the linear address $Y_L$ to the multiplication output $f_d(T)*\sin\theta$ and outputs the addition output $Y_L+f_d(T)*\sin\theta$ as a Y-axis read-out address $Y_{DL}$ for the lower picture.

The output T of the additive node 11 is fed to an offset addition unit 24 and is used for outputting a pseudo data Z. The pseudo data Z is the depth information employed for removing the unnecessary information from the picture shown in FIG. 11. The pseudo data Z is a pre-set value on the T-axis defining the fold line L which is a line of intersection of the upper and lower pictures, and represents data the values of which are monotonously increased along the T-axis which is the folding direction of folding having the fold line L as the reference. In the case of the page turning effect, offsets are added to the T-axis data so that the value 0 is reached on the fold line L.

Returning to FIG. 8, the two addresses generated by the page turning address generating circuit 6, that is the upper picture ($X_{UL}$, $Y_{UL}$) and the read-out addresses for the lower picture ($X_{DL}$, $Y_{DL}$), are supplied to a multiplexor 7. The multiplexer time-divisionally multiplexes the two addresses to produce time-divisionally multiplexed read-out addresses ($X_{GL}$, $Y_{GL}$) which are supplied to the video memory 1 and the key memory 2. The rate of the time-divisionally multiplexed read-out addresses ($X_{GL}$, $Y_{GL}$) is twice the sampling period.

The video memory 1 and the key memory 2 respectively output a non-linear effect picture and key signals in accordance with the time-divisionally multiplexed read-out addresses ($X_{GL}$, $Y_{GL}$) The non-linear effect picture outputted by the video memory 1 is fed to a demultiplexor 8a so as to be divided into an upper video signal $V_a$ and a lower video signal $V_b$. The key signal outputted by the key memory 2 is fed to a demultiplexor 8b so as to be divided into an upper key signal $K_a$ and a lower key signal $K_b$. The upper video signal $V_a$ and lower video signal $V_b$ and the upper key signal $K_a$ and lower key signal $K_b$, divided by the demultiplexors 8a, 8b, are supplied to a combiner processing circuit 9.

Figure 12:
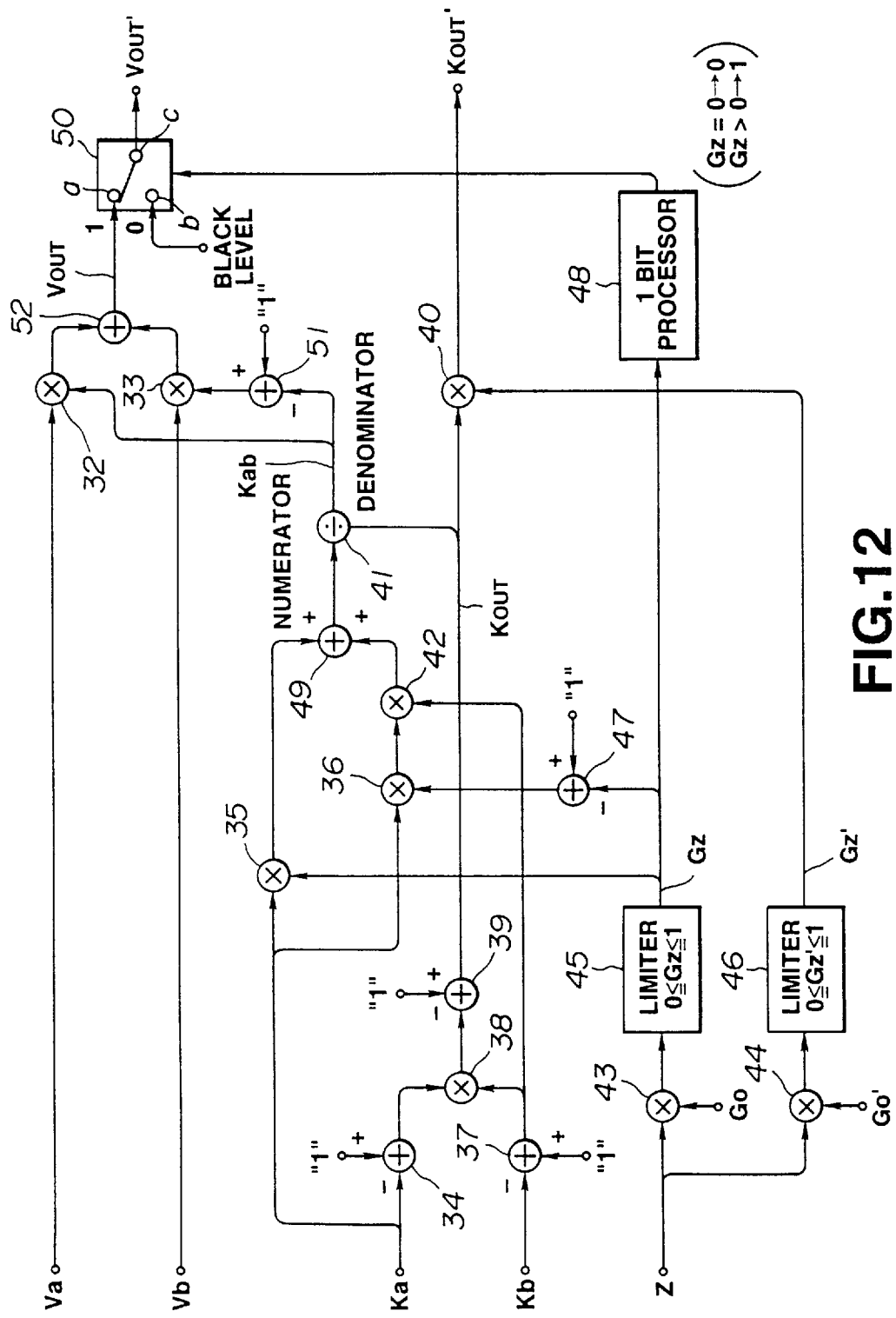
FIG. 12 is a block circuit diagram showing an illustrative construction of the combiner processing circuit.
Figure 13:
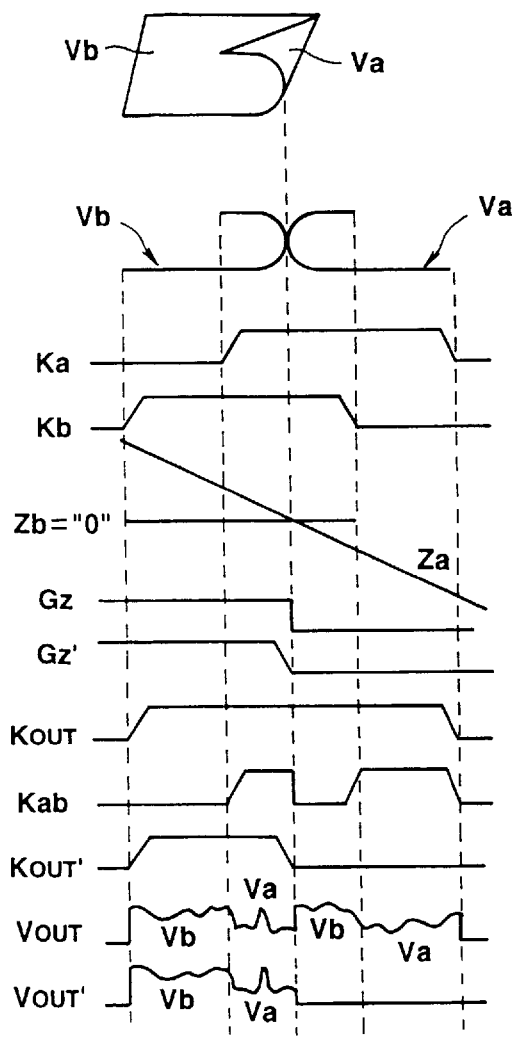
FIG. 13 is a signal waveform diagram for illustrating the operation of the special effect picture device having the combiner processing circuit shown in FIG. 5.

The combiner processing circuit 9, arranged and designed as shown in FIG. 12, smooches picture edge portions on a line of transition from the upper picture to the lower picture. The processing in each component portion is explained by referring to the signal waveform diagram shown in FIG. 13.

The upper video signal $V_a$ and lower video signal $V_b$, outputted by the demultiplexor 8a shown in FIG. 8, are supplied to multipliers 32 and 33, respectively. The upper key signal $K_a$, outputted by the demultiplexor 8b, is supplied to a subtractive node 34, fed with "1", and to multipliers 35, 36. The lower key signal $K_b$, similarly outputted by the demultiplexor 8b, is supplied to a subtractive node 34 fed with "1".

A subtraction output $(1-K_a)$ of the subtractive node 34 and a subtraction output $(1-K_b)$ of the subtractive node 37 are fed to a multiplier 38 to give a multiplication output $(1-K_a)*(1-K_b)$ which is supplied to a subtractive node 39 fed with "1". A subtractive output $\{1-((1-K_a)*(1-K_b))\}$ is fed as a key signal $K_{out}$ to a multiplier 40, while being fed as a denominator side value to a divider 41. The subtractive output $(1-K_b)$ of the subtractive unit 37 is also fed to the multiplier 42.

The pseudo data Z, outputted by the page pattern generating circuit 6 of FIG. 8, is fed to a multiplier 43 supplied with a gain $G_C$ and to a multiplier 44 supplied with a gain $G_C'$. The pseudo data is represented as the depth information $Z_a$ of the upper video signal $V_a$ less the depth information $Z_b$ of the lower video signal $V_b$, that is as $(Z_a-Z_b)$.

Thus the multiplication output of the multiplier 43 is $(Z_a-Z_b)*G_C$. The multiplication output $(Z_a-Z_b)G_C$ of the multiplier 43 is a priority signal $G_Z$ which is shaped from the pseudo data Z and which determines the priority. This priority signal $G_Z$ is limited by a limiter 45 so as to be in a range of not less than 0 and not more than 1. That is, $0 \leq G_Z \leq 1$. Thus the priority signal $G_Z$ determining the priority of $K_a$ and $K_b$ defined from the depth information, is given by $$G_Z'(Z_a-Z_b)G_C \tag{9}$$

where $0 \leq G_Z \leq 1$ and $G_C'$ is a suitable gain value. In the equation (9), $G_C$ is infinite since the inclination of the priority signal $G_Z$ in the combiner processing circuit 9 determines the degree of mixing of the intersecting portions of the two pictures. With the page turning effect, for example, the lower picture being mixed with the upper picture at the fold portion and being thus seen below the upper picture is not physically adequate. Consequently, $G_C$ is set so as to be infinite so that the priority signal $G_Z$ is free of inclination in the vicinity of the page turn fold point.

A multiplication output of the multiplier 44 is $(Z_a-Z_b)*G_C'$. The multiplication output $(Z_a-Z_b)*G_C'$ of the multiplier 44 is an other priority signal $G_Z'$. This priority signal $G_Z$ is limited by a limiter 46 so as to be in a range of not less than 0 and not more than 1. That is, $0 \leq G_Z' \leq 1$. This other priority signal $G_Z'$ is $$G_Z=(Z_a-Z_b)G_C' \tag{10}$$

where $0 \leq G_Z \leq 1$ and $G_C$ is a suitable coefficient. In the equation (10), the coefficient $G_c$ is selected to a suitable value for affording a suitable inclination to the priority signal $G_Z'$.

The priority signal $G_Z$ outputted by the limiter 45 is fed to the multiplier 35, subtractive node 47 and a 1-bit processor 48. The multiplier 35 multiplies the upper key signal $K_a$ with the priority signal $G_Z$ and outputs a multiplication output $K_a*G_Z$ to the additive node 49. The subtractive node 47 is fed with "1" and outputs a subtractive output $(1-G_Z)$ to the multiplier 36. The 1-bit processor 48 outputs a bi-level signal "0" and a bi-level signal "1" to a changeover switch 50 when the priority signal $G_Z$ is equal to $0(G_Z=0)$ and larger than $0(G_Z>0)$, respectively.

The other priority signal $G_Z'$ outputted by the limiter 46 is fed to the multiplier 40. The multiplier 40 multiplies the key signal $K_{out}(=\{(1-K_a)*(1-K_b))\}$, which is a subtraction output of the subtractive node 39, by the priority signal $G_Z'$ and outputs a multiplication output $K_{out}*G_Z'$ as an other multiplication output $K_{out}'$. Thus the other multiplication output is given by $$K_{out}'=K_{out}*G_Z' \qquad (11)$$

While the multiplication output $K_{out}$ is synthesized by intersecting two key signals and has unnecessary portions as the page turning effect, the other multiplication output $K_{out}'$ shown by the equation (11) has an unnecessary portion of the key signal of set to zero.

The multiplier 36 multiplies the subtractive output $(1-G_Z)$ of the subtractive node 47 by the upper key signal $K_a$ and outputs a multiplication output $K_a*(1-G_Z)$ to the multiplier 42. The multiplier 42 multiplies the multiplication output $K_a*(1-G_Z)$ by the subtractive output $(1-K_b)$ of the subtractive unit 37 and outputs a multiplication output $K_a*(1-G_Z)*(1-K_b)$ to the additive node 49. The additive node 49 adds a multiplication output $K_a*G_Z$ of the multiplier 35 to the multiplication output $K_a*(1-G_Z)*(1-K_b)$ and outputs the addition output $K_a*G_Z+K_a*(1-G_Z)*(1-K_b)$ to the divider as a numerator side data. The divider 41 is fed with the subtractive output $K_{out}$ of the subtractive node 39 as a denominator side data, such that the divider 41 outputs a division output $K_{ab}$ as $$K_{ab}=\{K_a*G_Z+(K_a*(1-G_Z)*(1-K_b)\}/K_{out} \qquad (12)$$

The division output $K_{ab}$, shown by the equation (12), is a key signal for synthesizing the upper video signal $V_a$ and the lower video signal $V_b$ and is fed to the multiplier 32 and a subtractive node 51.

The multiplier 32 multiplies the key signal $K_{ab}$ of the equation (12) with the upper video signal $V_a$ and outputs a multiplication output $V_a*K_{ab}$ to an additive node 52. The subtractive node 51 is fed with "1" and transmits a subtractive output $(1-K_{ab})$ to the multiplier 33. The multiplier 33 multiplies a subtractive output $(1-K_{ab})$ of the subtractive node 51 with the lower video signal $V_b$ and outputs a multiplication output $V_b*(1-K_{ab})$ to the additive node 52. The additive node 52 adds the multiplication output $V_a*K_{ab}$ of the multiplier 32 to the multiplication output $V_b*(1-K_{ab})$ of the multiplier 33 and outputs an addition output $V_{out}$ given by the equation $$V_{out}=V_a*K_{ab}+V_b*(1-K_{ab}) \qquad (13)$$

The addition output $V_{out}$ shown by the equation (13) is the combined video signal which is fed to a fixed input terminal a of the changeover switch 50.

The black level signal is fed to a fixed input terminal b of the changeover switch 50 and changeover selection by its movable contact c is controlled by the bi-level signal "1" or "0" supplied from the 1-bit processor 48. That is, if the priority signal $G_Z$ supplied to the 1-bit processor 48 is 0, "0" is supplied to the changeover switch 50, so that the movable contact c is connected to the fixed terminal b so that the black level signal is outputted as the video signal $V_{out}'$. Conversely, if the priority signal $G_Z$ supplied to the 1-bit processor 48 is larger than 0, "1" is supplied to the changeover switch 50, so that the movable contact c is connected to the fixed terminal a and the changeover switch 50 outputs the signal $V_{out}$ of the equation (13) from the additive node 52 as the video signal $V_{out}'$. Thus the unnecessary portion is deleted by arithmetic-logical operations such that if $G_Z=0$, $V_{out}'=$black level and if $G_Z>0$, $V_{out}'=V_{out}*G_Z$ as in the case of the key signals.

It is noted that both edges of the page turning effect are inclined for $K_{out}'$, while the edges of switching between $V_a$ and $V_b$ are smoothly mixed for $V_{out}$. Other edges are acutely changed over to the black level. However, edge serrations are not produced on synthesis by a switcher due to the inclination of $K_{out}'$.

Figure 14:
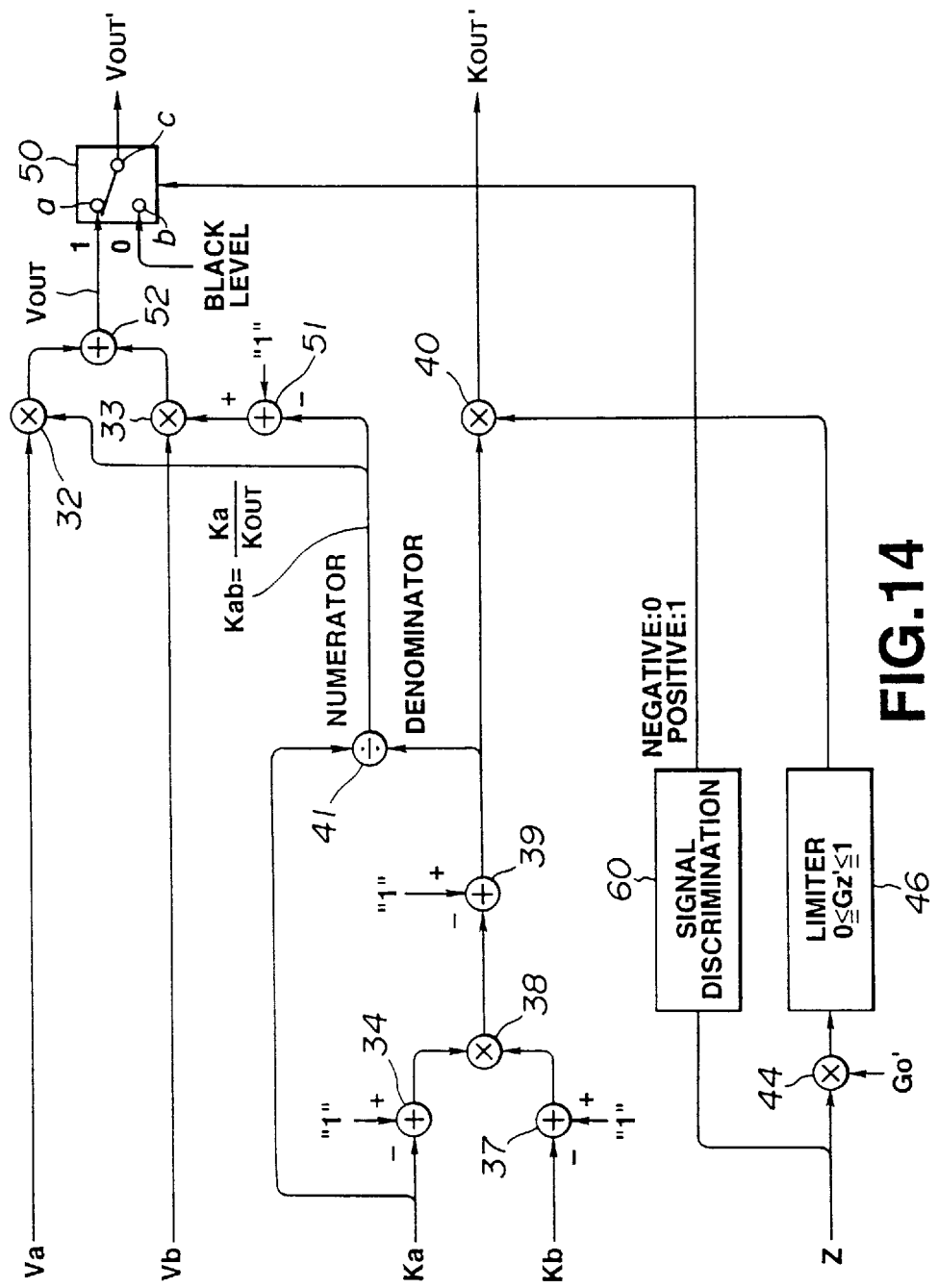
FIG. 14 is a block circuit diagram showing another illustrative construction of the combiner processing circuit.

Although the combiner processing circuit 9 in the present embodiment is arranged as shown in FIG. 12, the portion of the processing circuit for multiplying the priority signal with $G_Z$ may be replaced by a switch. The portion for deriving $G_Z$ may also be so designed as to set $G_Z$ to "0" or "1" by judging the sign of the pseudo data Z. FIG. 14 shows, in a detailed circuit diagram, a combiner processing circuit in which the $G_Z$ multiplying portion is omitted and a sign judgement circuit 60 is provided for such purpose. The sign judgement circuit 60 judges whether the sign of the pseudo data Z is positive or negative. The priority signal $G_Z$ is set to "1" or "0" according as the sign of the pseudo data Z is positive or negative, respectively. The resulting bi-level signal is fed to the changeover switch 50. The remaining portions of FIG. 14 which are similar to those shown in FIG. 12 are denoted by the same numerals and the explanation is omitted for simplicity.

Figure 15:
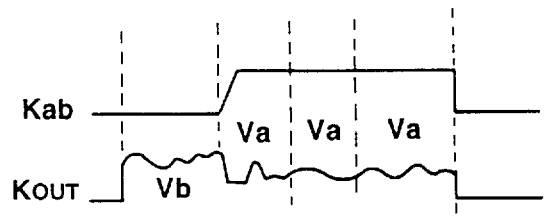
FIG. 15 is a signal waveform diagram for illustrating the operation of the special effect picture device having the combiner processing circuit shown in FIG. 7.

The combiner processing circuit shown in FIG. 14 provides the key signal $K_{ab}$, which is the division output of the divider 41 and which synthesizes the upper video signal $V_a$ and the lower video signal $V_b$, and the combined video signal $V_{out}$, which is the addition output of the additive node 52, with the waveforms shown in FIG. 15. Other waveform signals are the same as those shown in FIG. 13.

It is possible with the present embodiment of the special effect picture device to produce special effects other than page turning, such as cylindrical effects or spherical effects.

For S-shaped development of the respective addresses, the portions of the functions of the lookup tables corresponding to the ultimately deleted picture portions need not necessarily be stored.

It is also possible to provide two frame buffers for the video input and the key input. In such case, the same picture data may be stored in these buffers and read out using two readout addresses. In such case, there is no necessity of time-divisionally multiplexing the addresses, while there is no necessity of demultiplexing the read out data.

In the above embodiment, the priority signal $G_Z$ is zero for $Z_a=0$, so that the upper and lower pictures are overlapped with each other in the folding portion of the paper-turning effect. However, the priority signal may also be formed so that $G_Z'=0.5$ when $Z_a=0$. In such case, overlapping of the upper and lower pictures may be diminished. It is necessary to change the shaping method so that $G_Z$ is changed at a point of $G_Z'=0$.

What is claimed is:

1. Video image combining apparatus, comprising:
   receiving means for receiving first and second video signals, and first and second key signals corresponding to said first and second video signals, respectively, and a depth signal representative of depth information of said first video signal less depth information of said second video signal;
   adjusting means for adjusting a gain of said depth signal to generate a priority signal;
   key signal combining means for combining said first and second key signals to generate an output key signal;
   means for combining said first and second key signals, said priority signal and said output key signal to produce first and second resultant key signals; and video signal combining means for combining said first and second video signals based on said first and second resultant key signals to generate an output video signal ($V_{out}$).

2. Video image combining apparatus, comprising:

receiving means for receiving first and second video signals, and first and second key signals corresponding to said first and second video signals, respectively, and a depth signal representative of depth information of said first video signal less depth information of said second video signal;

adjusting means for adjusting a gain of said depth signal to generate a priority signal;

key signal combining means for combining said first and second key signals to generate an output key signal;

combine key signal generating means for generating a combine key signal from said first and second key signals, said priority signal and said output key signal; and video signal combining means for combining said first and second video signals based on said combine key signal to generate an output video signal.

3. Video image combining method, comprising the steps of:

receiving first and second video signals, and first and second key signals corresponding to said first and second video signals, respectively, and a depth signal representative of depth information of said first video signal less depth information of said second video signal;

adjusting a gain of said depth signal to generate a priority signal;

combining said first and second key signals to generate an output key signal;

generating a combine key signal from said first and second key signals, said priority signal and said output key signal; and combining said first and second video signals based on said combine key signal to generate an output video signal.

4. A special effect picture device for forming a transformed picture which is non-linear with respect to an original picture, using first and second video signals and a key signal for said original picture, comprising:

video signal storage means for storing said first and second video signals;

key signal storage means for storing said key signals;

read-out address generating means for generating read-out addresses for information concerning a first picture of the transformed picture and for information concerning a second picture of the transformed picture and for generating information concerning depth;

means for deriving from the key signal read out from the key signal storage means according to the read-out addresses output from the read-out address generating means a first key signal and a second key signal; and means for generating the transformed picture by synthesizing the first picture and the second picture of the transformed picture using the first and second key signals and eliminating unnecessary portions according to the depth information generated by said read-out address generating means, said means for generating the transformed picture including adjusting means for adjusting a gain of said depth information to generate a priority signal, key signal combining means for combining said first and second key signals to generate an output key signal, means for combining said first and second key signals, said priority signals and said output key signal to produce first and second resultant key signals, and video signal combining means for combining said first and second video signals based on said first and second resultant key signals to generate an output video signal.

* * * * *